July 23, 1968  J. BART LE POOLE  3,394,254
ELECTRON-OPTICAL SYSTEM WITH A MAGNETIC FOCUSSING
LENS HAVING A COOLING MEANS
Filed June 3, 1965  4 Sheets-Sheet 1

INVENTOR.
JAN B. LE POOLE
BY
Frank R. Trifari
AGENT

United States Patent Office 3,394,254
Patented July 23, 1968

3,394,254
ELECTRON-OPTICAL SYSTEM WITH A MAGNETIC FOCUSSING LENS HAVING A COOLING MEANS
Jan Bart Le Poole, Delft, Netherlands, assignor to North American Philips Company, Inc., a corporation of Delaware
Filed June 3, 1965, Ser. No. 460,981
Claims priority, application Netherlands, June 6, 1964, 6406449
20 Claims. (Cl. 250—49.5)

ABSTRACT OF THE DISCLOSURE

An electron optical system is described which employs a magnetic lens with a small spherical aberration. The lens employs a tubular coil whose axial length is at least one and one-half times the distance between the focussing plane of the coil and its adjacent end while the inner diameter of the coil does not exceed one-third of the axial length of the coil and the coil has a magnetic field configuration such that at each point on the axis of the coil within the coil there is a unidirectional magnetic field.

My invention relates to an electron-optical system comprising at least one magnetic lens which is energized by an electric current which focusses and locally surrounds the electron beam.

Examples of such apparatus are electron microscopes, microanalysis apparatus and apparatus for machining (drill vaporizing, engraving, welding) objects with an electron beam.

Usually, the magnetic lens used in such apparatus consists of coils which are provided with an iron shield, two magnetic poles which are slightly spaced apart being joined to the iron shield within the coil. With this type of lens focal distances in the order of magnitude of a few mms. can be attained. As is the case with optical lenses, magnetic lenses show the phenomenon of spherical aberration. Generally speaking it may be said, that the spherical aberration of a magnetic lens is determined by the ratio $f^3/c^2$, wherein $f$ is the focal distance and $c$ the diagonal of the pole distance, i.e. the distance between a point of one pole and the opposite point of the other pole. Usually, the diameter of the aperture in the poles and the pole distances are approximately equal to one another.

There are conditions, in which it is not necessary, and even undesirable, to have a lens which has such a small focal distance as indicated above. This may be realized with the usual magnetic lenses by using a smaller energization but this is associated with a strong increase in the spherical aberration about which little can be done if attenuation of the electron beam by utilizing smaller diaphragms is not desired. In the case of microanalysis in which the electron beam is focussed on the material which is to be tested and X-rays produced therein by the electrons, it is preferable that the electrons be concentrated on a surface which is as small as possible. In order to be able to receive the X-rays emerging from the specimen to be tested at an angle which is as large as possible, naturally a certain spacing between the specimen and the lens which focusses the electron beam on the specimen is required. Therefore, this lens must have a comparatively small outside diameter in addition to a comparatively larger focal distance and a spherical aberration which is as small as possible.

In other instances also, where a reduced image is desired, for example, in the condenser lens of an electron microscope, or in case of an intermediate lens provided between the objective lens and the projector lens of an electron microscope for diffraction investigation, it is preferable to have an electron lens available having a comparatively large focal distance in combination with small spherical aberration and a slightly extended magnetic leakage field.

The invention provides an electron beam apparatus of the above-described type in which a magnetic lens is present which satisfies the above requirements better than the normal lenses with an iron shield terminating into slightly spaced apart magnetic poles. This lens construction presents even further advantages.

It has been found, however, that in case of a magnetic leans having a focus which is located at some significant distance from the lens an admissible spherical aberration is obtained if the "half-value length" of the magnetic field along the axis of the lens is chosen to be considerably larger than is the case in the usual lenses with jacket poles arranged on the inner ends of an iron shield surrounding the coil.

"Half-value length" is understood to mean herein the distance between those points on the axis where the curve representing the axial magnetic field strength at each point on the axis has an inflection point. By choosing the "half-value length" to be considerably larger than is usual, the diameter of the central aperture of the lens may be chosen to be as small as possible to permit the electron beam to pass through the lens. It has been found that the spherical aberration of a lens which has a focussing plane behind it at a distance $a$ beyond the point where the curve representing the axial magnetic field strength in each point of the axis has an inflection point, is comparatively low and consequently acceptable when the "half-value length" of the said lens lies between $1.5a$ and $4.5a$.

Therefore, according to the invention, an electron beam apparatus of the type described earlier includes a magnetic lens, hereinafter termed "tubular lens," which is substantially formed by a coil which is closely wound and is comparatively long in relation to its mean diameter. A focussing plane of the said lens in the direction of the electron beam is located at some distance beyond the coil. The "half-value length" of the magnetic field along the axis is at least one and a half times and not more than four and a half times the distance between the said focussing plane and the adjacent end of the coil. The inner diameter of the coil should not exceed one third of the said "half-value length."

An additional, but nevertheless not unimportant, advantage of the electron beam apparatus according to the invention, is that in view of the comparatively large "half-value length" of the "tubular lens," no provision is made inside the coil of poles of magnetically conducting material; accordingly the provision of magnetically conducting material inside the lens can nearly always be dispensed with. Such magnetically conducting material is as a rule quite superfluous. This means that, in contrast with the usual lenses comprising a coil provided with a magnetic shield ending inside the coil in poles, not only is no trouble due to magnetic hysteresis experienced, but also that the turns of the coil of the "tubular lens" located nearest to the axis may have a diameter which is only slightly larger than that of the free aperture of the lens and the diameter of the electron beam passing through the lens respectively. As a result thereof, the copper losses which with a given number of turns increase with the mean coil diameter, are smaller. The invention also makes it possible to provide a cooling member around the coil without increasing the outside diameter of the "tubular lens" in an undesirable manner. Another advantage of the comparatively small diameter of the free aperture of the "tubular lens" is that the total magnetic flux of this lens is small and that consequently the magnetic field beyond the ends of the coil is only weak.

Preferably the "tubular lens" is provided with a cooling member of a readily heat conducting material, which surrounds the coil and is in heat conducting contact with it, and preferably engages circumferentially the entire outside of the coil. The dimensions of the coil of the "tubular lens" and consequently also of the "tubular lens" itself can be small if the copper space factor of the coil and the current density in the coil per unit of surface of the longitudinal cross-section are larger provided that the coil can be cooled sufficiently by means of the cooling member. In a favorable embodiment of the "tubular lens" the copper space factor of the coil exceeds 0.5 and the current density in the coil exceeds 15 amp. per mm.$^2$.

Since the "tubular lens" has a concentrating action on the electron beam, the free aperture of the "tubular lens" may be made smaller without objection on the side where the electron beam emerges than on the other side. As a result of this, it is possible that the number of turns per unit of length of the coil at the end thereof where the electron beam leaves the "tubular lens" is larger than at the end where the electron beam enters the "tubular lens" without it being necessary to enlarge the outside diameter of the lens for that purpose. The resulting field variation along the axis, in which the field has a maximum towards the end of the coil where the electron beam leaves the lens is more favorable, as far as the spherical aberration is concerned, than the more homogeneous field which is found in a very evenly wound coil with a constant inside diameter.

A particular embodiment of the electron beam apparatus according to the invention is constituted by an X-ray analyzer with a micro-electron beam probe, the "tubular lens" focussing the electron beam on the specimen to be analyzed.

Another embodiment of the electron beam apparatus according to the invention is constituted by an electron microscope which is provided with at least one condenser lens and with an objective lens provided with an iron shield with pole pieces, the "tubular lens" serving as the condenser lens focussing the electron beam on the specimen and being incorporated in the central cavity of the objective lens, located on the side of the electron source and being circumferentially in heat-conducting contact with the magnetic shield of said objective lens.

A further embodiment is constituted by an electron microscope which is provided with a diffraction lens following the objective which is formed by a "tubular lens" in accordance with the invention The invention will be described in greater detail with reference to the accompanying drawing, in which:

FIG. 1 diagrammatically shows an X-ray analyzer with micro-electron beam probe according to the invention;

Figure 4:
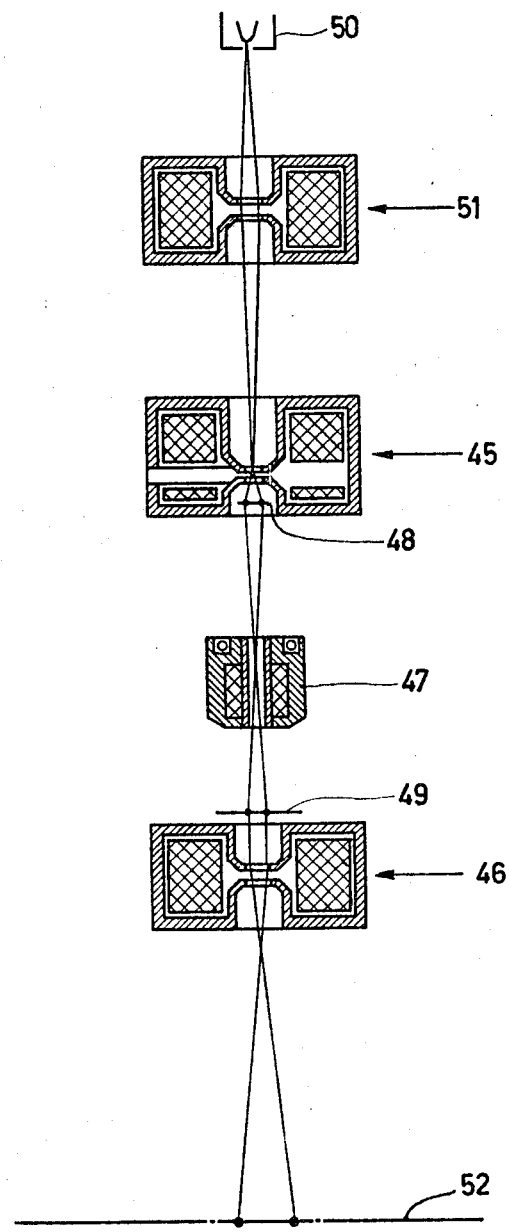
Figure 5:
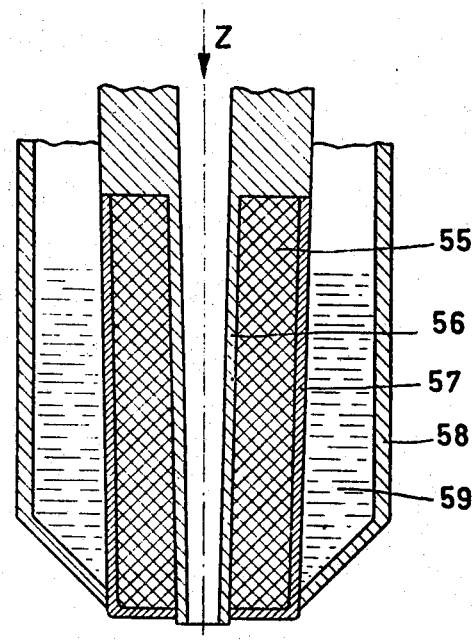
Figure 6:
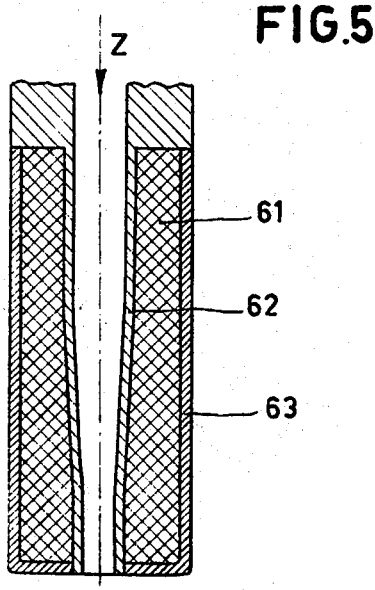

FIG. 4 diagrammatically shows an electron microscope which is provided with a diffraction lens constructed as a "tubular lens" according to the invention;

FIGS. 5 and 6 diagrammatically show cross-sectional views of two other embodiments of the coil of the "tubular lens" to be used according to the invention.

Figure 1:
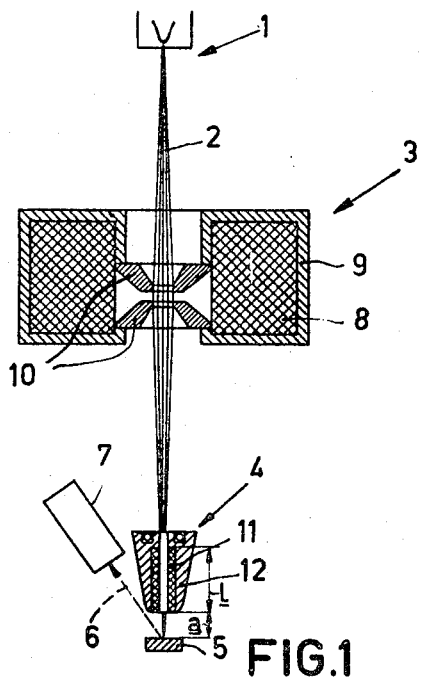

FIG. 1 shows diagrammatically an X-ray analyzer with an electron beam probe, an electron beam emerging from an electron gun 1 which is accelerated to approximately 50 kv. and focussed in a substantially punctiform manner onto the surface of the specimen 5 under examination by means of magnetic lenses 3 and 4. As a result of the electron impact, X-rays 6 are formed in the surface of the specimen which rays contain one or more wave lengths which are characteristic of the material of that surface. These X-rays 6 are investigated with an X-ray spectrograph 7 which, as is usual, may comprise an analyzer crystal and an X-ray detector mounted on a goniometer arm.

The lens 3 is a commonly used electromagnetic lens including an energization coil 8 which is surrounded by an iron shield 9 having two perforated magnetic poles 10 within the coil. The lens 4 on the contrary is constructed as a "tubular lens" according to the invention. This lens 4 substantially consists of an energizing coil 11 having small transverse proportions, the length of which is several times the average diameter and of a cooling jacket 12 surrounding the coil 11. As a result of this construction the lens 4 has a comparatively small diameter so that it is possible for the X-ray spectrograph 7 to receive X-rays from the beam 6 which enclose an angle of not much more than approximately 30° with the direction of the beam 2. Such a small angle is favorable with a view to the intensity.

Figure 2:
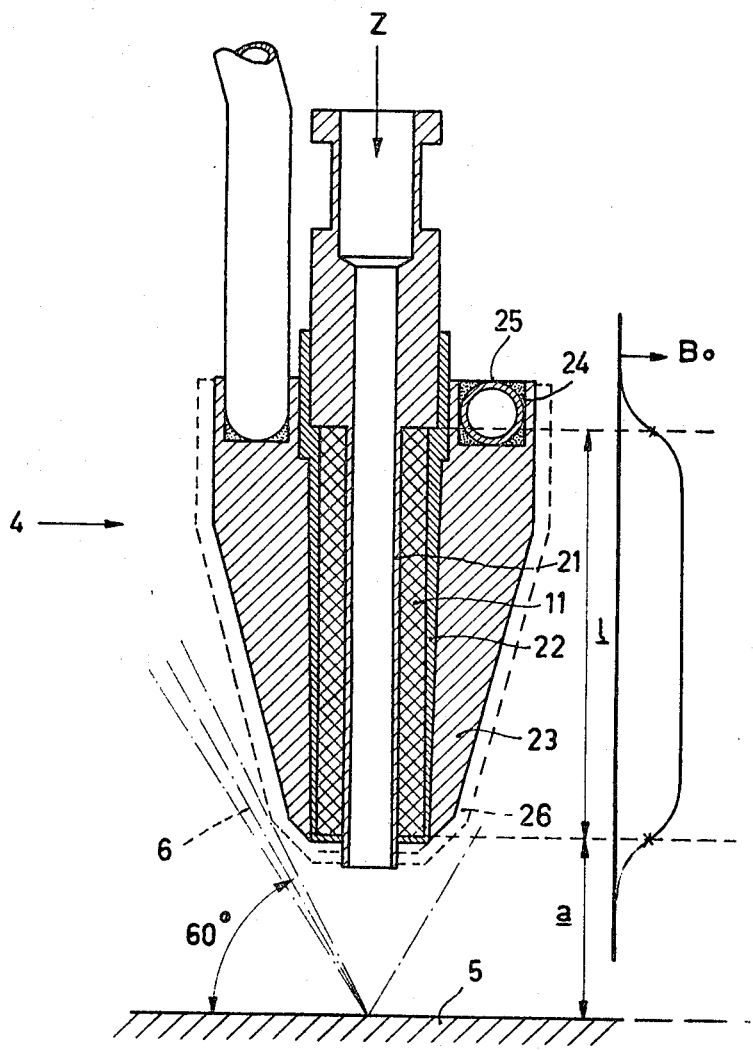
FIG. 2 shows on an enlarged scale a cross-sectional view of a tubular lens to be used in the X-ray analyzer shown in FIG. 1.

A transverse cross-section of an embodiment of the lens 4 is shown in FIG. 2 in greater detail. On a tube 21, which consists of non-ferromagnetic metal, for example, copper, having an outside diameter of approximately 3 mm. and a wall thickness of approximately 0.35 mm. a coil 11 is wound with resin coated wire having a diameter of 0.25 mm. This coil which a length of approximately 22 mm. and an outside diameter of 6 mm. contains well over 500 turns. The part of the volume of the coil taken up by the copper of the wire (filling factor) of the coil 11 is comparatively high, namely approximately 60%. This filling factor is obtained by compressing the coil axially after winding and restraining the lateral expansion by means of auxiliary members. It has been found that the original cylindrical cross-section of the wire obtains a somewhat hexagonal shape. On its outside the coil is silver-plated and then provided with a copper layer 22 by electro-deposition.

This copper layer 22 is accurately turned so that the assembly fits accurately in the central aperture of a cooling jacket 23 which likewise consists of copper. This cooling jacket has a somewhat conical shape and is additionally bevelled on the lower end of the lens, that is to say, at the end facing the specimen 5. On its upper end the cooling jacket 23 is provided with a circumferential groove 24 in which a metal pipe 25 is soldered. Through pipe 25 a cooling liquid, for example, water, is conducted.

Immediately above the coil, that is to say, at the end of the lens where the electron beam 2 enters (direction of bear 2) the tube 21 carrying the coil 11 has a considerably greater wall thickness. With this portion the "tubular lens" can be mounted in the apparatus shown in FIG. 1. This thickened portion further promotes the dissipation of the heat generated in the coil to the cooling jacket 23.

It may be desirable, for example, in order to minimize the leakage field of the lens which, as a result of the small average diameter of the coil 11 in consequence of which the total magnetic flux is comparatively low, is none too strongly, to surround the cooling jacket 23 with a further jacket of a magnetically readily conducting material, for example iron. Such a jacket is denoted in FIG. 2 by 26, and its outside is indicated by a broken line. In accordance with the invention the "half-value length" of the actual magnetic field of the lens 4 must be at least one and a half times and at most four and a half times the distance between the focal plane located beyond the lens and the end of the coil located nearest to same. The axial magnetic field strength of the coil 11 is indicated in the right hand part of FIG. 2 for the case when no iron jacket 26 is present. The "half-value length" denoted by $l$ is now equal to the axial length of the coil 11. When such an iron jacket is present, the "half-value length" is somewhat larger, even though it may be comparatively small.

In the analyzer shown in FIG. 1, the electron beam at the area of the surface of the specimen 5 must have a cross-section which is as small as possible which means that this surface lies substantially in the focal plane of the len 4 located beyond the said lens.

The distance $a$ between the lower end of the coil 11 and the surface of the specimen under examination is approximately 10.6 mm. in the apparatus described, so that the ratio $1/a$ in this case substantially equals 2. In order that the focal plane of the lens 4 with the coil 11 be located at the area of the specimen 5, the coil 11 is energized with a current of approximately 2.5 to 3 amperes (there are 1500 to 1800 amp. turns required). As a result of the presence of the cooling jacket the current in the coil 11 may be increased to approximately 4 amperes. This means a current density in the wire of the coil of nearly 80 amperes per mm.$^2$ of coil cross-section. It is precisely the small inside diameter and the comparatively small thickness of the coil 11 (that is to say, half of the difference between the outside diameter and the inside diameter), which renders such a high specific electric load of the coil 11 possible. It is the small thickness of the coil in particular which assists the coil in maintaining an even temperature so that undesired local resistance variations are prevented. It is precisely these different proportions as compared with the normally used coils with iron shields and poles, that make the "tubular lens" used in accordance with the invention very suitable for many uses.

For example, FIG. 2 also clearly shows that in the analyzer of FIG. 1 the small transverse proportion of the lens 4 permits the spectrograph 7 to receive the X-rays 6 emerging from the specimen 5, which rays make an angle of 60° with the surface of this specimen which is favorable in connection with absorption occurring in the specimen itself for smaller angles.

Figure 3:
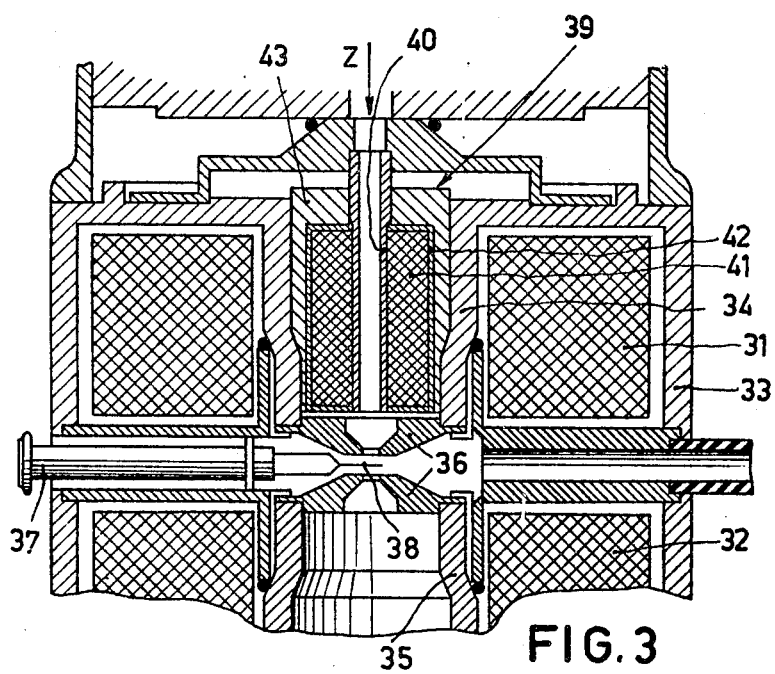
FIG. 3 shows a cross-sectional view of an objective lens of an electron microscope comprising a "tubular lens" in accordance with the invention.

It is preferable to make the inside diameter of the coil 11 of the "tubular lens" and of the support (tube 21) of the coil, respectively, as small as is permitted by the circumstances because with a decreasing diameter the heat generated at a given current density decreases while the leakage field also becomes smaller as a result of the decrease of the total flux. As a result of this the "tubular lens" to be used in accordance with the invention is suitable for use in a manner such as is not possible with the normally used lenses with iron jackets and poles. An example hereof is illustrated in FIG. 3. It is noted that the inside diameter of the coil and the support thereof respectively cannot be decreased without restriction. Naturally a lower limit is imposed by the diameter of the electron beam to be passed by the "tubular lens;" as a rule, however, the free aperture should be chosen to be somewhat wider to prevent contamination of the inner wall of the "tubular lens" during operation.

FIG. 3 is a cross-sectional view of that part of an electron microscope according to the invention which comprises an electro-magnetic objective lens. This objective lens is constituted by two coils 31 and 32 which are enclosed in an iron shield 33. The inwardly projecting parts 34 and 35 of this shield terminating at some distance from each other each carry a conical and centrally perforated pole 36. By means of a specimen holder 37, a specimen 38 to be reproduced by means of an electron beam passing in the direction Z can be provided between the said poles. Inside the upper portion of the objective lens, that is to say on the side of the incoming electron beam and in the aperture of the objective lens surrounded by the portion 34 of the iron shield, a "tubular lens" 39 is provided. As is the case in the "tubular lens" shown in FIG. 2, this "tubular lens" also consists of a thin-walled copper tube 40 with a coil 41 wound around it, this coil being surrounded by a copper layer 42 provided on a silver layer by electro-deposition. This copper layer is turned so that the assembly fits in a copper cooling jacket 43 which is substantially cylindrical and which in turn exactly fits into the upper central aperture of the objective lens. The coil 41 has a length of approximately 20 mm. and comprises approximately 2500 turns in 16 winding layers. This coil also is axially compressed after winding. When energized with a current of approximately 0.8 amperes so that there are approximately 2000 ampere-turns, the field in the said coil has an intensity of approximately 1000 gauss. The free aperture of the "tubular lens" 39, that is to say the surface of the aperture of the tube 40, is approximately 10 mm.$^2$, the outside diameter of the coil 14 is approximately 6 mm., the outside diameter of the cooling jacket 43 at its top is approximately 15 mm. It is noted that in FIG. 3, the various dimensions are not shown in their correct proportions. It should be noted that for the sake of clarity the transverse dimensions of the "tubular lens" 39 are drawn proportionally too large. Furthermore, various dimensions of the "tubular lens" 39 and the objective lens in the said direction are not shown in their correct proportions. The focal plane of the "tubular lens" 39 lying in the direction Z beyond the said lens lies at approximately ⅓ of the length of the coil beyond the lower end of this coil and lies before the specimen, so that the "tubular lens" 39 operates as a reducing condenser lens. The objective lens is cooled in known manner by means of water (not shown in FIG. 3). As a result of the intimate heat-conducting contact of the coil 41 with the iron shield 33 through the copper layer 42, and the cooling jacket 43, separate cooling of the "tubular lens" 39 is not required.

The "tubular lens" 39 may be provided with a stigmator (not shown) which is housed in grooves in the outer wall of the cooling jacket 43. The stigmator may consist for example, of two coils arranged opposite to each other with their faces parallel to the Z direction, the parts of such a coil extending parallel to the Z direction being spaced apart one-fourth of the circumference of the cooling jacket 43.

FIG. 4 shows diagrammatically an electron microscope with which diffraction images also can be obtained. For that purpose a weak lens 47 is provided in known manner between the objective lens 45 and the projector lens 46, the said lens 47 producing preferably a reduced image of the diffraction image formed in the focal plane 48 of the objective lens 45 in the object plane 49 of the projector lens 46. The microscope further comprises an electron gun 50, a condenser lens 51, and a screen 52 which receives the ultimate diffraction image. In accordance with the invention the diffraction lens 47 is formed by a "tubular lens" according to the invention, for example a "tubular lens" as shown in FIG. 2.

In addition to the lower energization energy which is associated with the small inside diameter as compared with a conventional lens the advantage of the use of such a "tubular lens" as a diffraction lens also lies in the low value of the leakage field, as a result of which disturbances which would otherwise occur are prevented.

In the "tubular lens" shown in and described in connection with FIGS. 1 to 4, the coils thereof are wound on a copper tube with a constant diameter and the number of turns per unit of length in the direction of the axes is constant. Neither one nor the other is necessary, it even being desirable to decrease the inside diameter of the coil—and when the said coil is wound on a support to decrease the diameter of the support, in the direction of the electron beam passing through the lens and to increase the number of turns per cm. unit of length. Decreasing the inside diameter of the coil, in this case the support may be done without objection within certain limits because the field of the coil gradually decreases the diameter of the electron beam. An advantage is a reduction of the thermal energy at a given energizing current through the coil. Increasing the number of turns per cm. of length of axis towards that end of the coil where the electron beam emerges has the advantage that the field variation is somewhat more favorable in order to keep the spherical aberrations small.

In the "tubular lens" shown in cross-section in FIG. 5, the coil 55 is wound with a constant number of turns per unit of axial length on a slightly conical tube 56 which consists of nonmagnetically conducting metal. Accordingly, the coil 55 also has a slightly conical shape. As was the case in the "tubular lens" of FIG. 2, the coil 55 in this case also is provided with a metal layer 57, for example copper, deposited on a silver layer by electrodeposition. The assembly is surrounded by a hollow metal cooling jacket 58 which adjoins the layer 57 at the bottom and which is filled substantially with an evenly low-boiling-point liquid 59, for example benzene. By means not shown, the vapor formed during boiling is conducted away and condensed at a favorable point, after which the condensed liquid is returned to the jacket 58.

FIG. 6 shows on an enlarged scale a cross-sectional view of the coil with the support of a "tubular lens" to be used according to the invention, in which in the direction of the electron beam (direction Z) both the inside diameter of the coil 61 of the "tubular lens" decreases and the number of turns per unit of axial length increases. The coil 61 is wound on a copper tube 62, the diameter of which gradually decreases over part of the wound length. The coil 61 is wound so that the outer surface forms a cylindrical surface extending parallel to the axis. In this case also the coil is provided with a metal layer 63 deposited on a silver layer or another suitable metal layer by electro-deposition which layer forms a cooling member for the coil 61 and is in heat exchanging contact with a further cooling jacket or cooling medium. It is noted that in the "tubular lens" of FIGS. 5 and 6, the "half-value length" of the axial magnetic field, which is defined as the distance in the axial direction measured from the points where the curve which represents the axial magnetic field that has an inflection point, is substantially equal to the axial length of the coil of the lens. In all the cases shown, the "tubular lens" internally contains no magnetically permeable material. However, in order to be able, for example, to make the outside diameter of the coil smaller, the length of the coil could be chosen to be longer than the "half-value length" of the axial magnetic field and the correct length could be obtained by inserting in one or both ends of the coil a magnetically permeable tube in a manner such that the distance between such tube and the other end of the coil and a second similar tube respectively is approximately equal to the desired half-value. A drawback is that, to maintain the same free passage from the electron beam, the inside diameter of the coil, at least at the area of such a magnetically permeable tube, must be larger with a view to a sufficient wall thickness thereof so that not in all the cases a more favorable outside diameter can be obtained as compared with the "tubular lens" described in the above examples.

In order to keep any disturbing influences of the magnetic field around the supply wires to the coil of the "tubular lens" to be used according to the invention small, it is desirable that the energizing current be smaller than approximately 6 amperes.

In order to prevent inhomogeneity in the field of the coil, it must be wound accurately. A manner of preventing such inhomogeneities is to wind a much thinner wire together with the current supply wire, which thinner wire during winding one layer, fills the groove between the successive turns on the outside of the layer. As a result of this a substantially flat base is obtained for winding the following layer.

It has been found that favorable results are obtained by winding all the layers of the coil separately and in the same direction and then connecting the various layers electrically by means of parts of wires by-passing all the layers in the axial direction. In this case, those wire parts connecting the ends of the layers together are preferably distributed evenly on the circumference of the coil.

While I have described the invention with reference to particular embodiments and applications thereof, other modifications will be readily apparent to those skilled in this art without departing from the spirit and scope of the invention as defined in the appended claims.

What I claim is:

1. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

2. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, and a support for said coil constituted of a non-magnetic material, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

3. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, and a thermally conductive member in heat conductive relationship with said coil for cooling the coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

4. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, and a thermally conductive member circumferentially engaging the coil for cooling the same, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

5. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, and a metal jacket surrounding and in heat-transfer relationship with the coil to cool the same, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

6. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, and a thermally conductive cup-shaped member surrounding the coil, said cup-shaped member being filled with a heat transferring liquid for cooling the coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

7. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, a metal jacket surrounding and in heat-transfer relationship with said coil, hollow jacket enclosing and spaced from said metal jacket, and a heat-transferring liquid filling the space between the metal jacket and the hollow jacket for cooling the coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

8. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the the coil within said coil, and a layer of metal surrounding and in heat-transfer relationship with said coil for cooling the same, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

9. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, a layer of copper surrounding the coil, and a layer of silver intermediate the copper layer and the coil and in thermal contact therewith to cool the coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

10. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, a support for said coil, a support constituted of a heat-conductive nonmagnetic material, and a cooling member surrounding said coil and in heat-conductive contact with said support, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

11. In an electron-optical device, a magnetic lens surrounding an electron beam for focussing the beam, said lens comprising a closely-wound coil having a length which is substantially greater than the mean diameter of the coil and a given longitudinal cross-section, said coil having a magnetic field configuration whereby a unidirectional magnetic field is present at each point on the axis of the coil within said coil, and a cooling member surrounding and in heat-transfer relationship with said coil, said coil having a filling factor of at least 0.5 and being energized by an electric current having a density in the coil exceeding 15 amps./cm.$^2$ of the longitudinal cross-section of the coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

12. In an electron-optical device, a magnetic lens energized with an electric current surrounding an electron beam for focussing the beam, said lens comprising a closely-wound coil having a length which is substantially greater than the mean diameter of the coil, said coil comprising a plurality of layers each starting at one and the same end of the coil and wound in the same sense and electrical connections for each of said layers extending externally of the coil, said coil having a magnetic field configuration whereby a unidirectional magnetic field is present at each point on the axis of the coil within said coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

13. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, said coil comprising a plurality of layers, each of said layers comprising a plurality of turns and a separate wire between successive turns filling the space therebetween whereby the turns of each layer form a smooth exterior surface, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

14. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within the coil, said coil comprising a plurality of turns the number of which per unit of length increases in the direction from the end at which the electron beam enters to the end from which the electron beam emerges, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

15. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, said coil having an inner diameter which decreases from the end at which the electron beam enters the coil to the end from which the electron beam emerges, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

16. In an electron-optical device, a magnetic lens energized with an electric current of less than approximately 6 amperes surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

17. In an X-ray analysis apparatus, a magnetic lens energized with an electric current surrounding an electron beam for focussing the beam onto a portion of the surface of an object to be examined, the electron beam incident upon said surface generating X-rays therefrom which can be detected, said lens comprising a closely-wound coil having a length which is substantially greater than the mean diameter of the coil, said coil having a magnetic field configuration whereby a unidirectional magnetic field is present at each point on the axis of the coil within the coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

18. In an electron microscope having a source of electrons, an objective lens, an iron shield surrounding said objective lens having pole-pieces integral therewith within said lens, said shield having a recess, and a condenser lens on the side of the objective lens adjacent the electron source, said condenser lens being positioned in said recess and comprising a magnetic lens energized with an electric current surrounding the electron beam from said source for focussing the beam, said lens comprising a closely-wound coil having a length which is substantially greater than the mean diameter of the coil, said coil having a magnetic field configuration whereby a unidirectional magnetic field is present at each point on the axis of the coil within said coil, said coil being in heat conducting relationship with said iron shield, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

19. In an electron microscope including an electron beam source, an objective lens and a diffraction lens comprising a magnetic lens energized with an electric current surrounding the electron beam for focussing the beam after diffraction by a specimen positioned between the objective lens and the diffraction lens, said lens comprising a closely-wound coil having a length which is substantially greater than the mean diameter of the coil, said coil having a magnetic field configuration whereby a unidirectional magnetic field is present at each point on the axis of the coil within said coil, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

20. In an electron-optical device, a magnetic lens energized with an electric current surrounding an electron beam for focussing the beam, said lens comprising a closely-wound coil having a length which is substantially greater than the mean diameter of the coil, said coil having a magnetic field configuration whereby a unidirectional magnetic field is present at each point on the axis of the coil within said coil, a support of nonmagnetic conductive material for said coil, a jacket of heat-conductive metal surrounding and spaced from the coil and in heat conductive relationship with said support, and a cooling liquid filling said jacket, said coil having a mean diameter which decreases in the direction from the end of the coil into which the electron beam enters towards the end from which the beam emerges, said lens having a focussing plane in the direction of the electron beam beyond the end of the coil from which the beam after passing through the coil emerges, the axial length of the coil being at least one and one-half times the distance between the focussing plane of the coil and the adjacent end of the coil, the inner diameter of the coil not exceeding one-third of the said axial length of the coil.

References Cited
UNITED STATES PATENTS

| | | | |
|---|---|---|---|
| 2,202,505 | 5/1940 | Ridgeway | 335—213 |
| 2,247,524 | 7/1941 | Schuchmann et al. | 250—49.5 |
| 3,008,044 | 11/1961 | Buchhold | 250—49.5 |
| 3,225,248 | 12/1965 | Scheffels | 313—84 |

RALPH G. NILSON, *Primary Examiner.*

A. L. BIRCH, *Assistant Examiner.*